United States Patent [19]

Higami

[11] Patent Number: 5,012,643

[45] Date of Patent: May 7, 1991

[54] PRESSURE-DRIVEN ENGINE

[76] Inventor: Masanobu Higami, 14-10, 2-chome, Asahi-machi, Takarazuka-shi, Hyogo-ken, Japan

[21] Appl. No.: 447,552

[22] Filed: Dec. 7, 1989

[51] Int. Cl.[5] .......... F16D 31/02

[52] U.S. Cl. .......... 60/369; 251/65; 251/75; 91/269; 91/273; 91/275; 91/346; 91/DIG. 4

[58] Field of Search .......... 91/265, 269, 272, 273, 91/275, 344, 346, DIG. 4; 60/369; 251/65, 75; 137/596.1, 871

[56] References Cited

U.S. PATENT DOCUMENTS

| | | | |
|---|---|---|---|
| 2,298,106 | 10/1942 | Carlson | 91/346 |
| 2,691,965 | 10/1954 | Honegger | 91/273 |
| 3,013,531 | 12/1961 | Mueller et al. | 91/275 |
| 3,421,448 | 1/1969 | Brewer et al. | 91/275 |
| 3,888,278 | 6/1975 | Hanks | 251/75 |
| 4,212,163 | 7/1980 | Mikina | 91/273 |
| 4,276,001 | 6/1981 | Holmes | 91/275 |
| 4,509,402 | 4/1985 | Salmonson | 91/275 |

FOREIGN PATENT DOCUMENTS

| | | | |
|---|---|---|---|
| 136057 | 5/1948 | Australia | 91/346 |

*Primary Examiner*—Edward K. Look
*Assistant Examiner*—F. Daniel Lopez
*Attorney, Agent, or Firm*—George Oujevolk; Joseph C. Mason, Jr.

[57] ABSTRACT

A pressure-driven engine is provided therein with an intake valve and an exhaust valve the opening and closing operations of which are controlled by a combination of the urging force of the respective springs and the attractive force of the respective magnets. The engine automatically repeats reciprocating motion merely by supplying a pressure source such as steam or various kinds of compression gas. The reciprocating motion or the rotational motion converted from the reciprocating motion is utilized as a power.

4 Claims, 2 Drawing Sheets

PRESSURE-DRIVEN ENGINE

BACKGROUND OF THE INVENTION

As a conventional reciprocating engine, an internal combustion engine represented by a gasoline engine is known. However, the drive of a gasoline engine is accompanied by noise, exhaust gas and vibration. In addition, a gasoline engine is difficult to carry and the use thereof is limited from the point of view of fire prevention. Therefore, the reciprocating motion of a pressure-driving source such as an air cylinder is utilized, as, for example, a power for a power-driven nipper, a power-driven scissors or a combustible treating apparatus.

For example, in nippers for shearing lead wires and metal plates by the power of compression air, the blades are opened and closed by the reciprocating motion of an ordinary air cylinder, and in the air cylinder, the inflow and outflow of the compression air, in other words, the intake and the exhaust of air is controlled by a manual valve or a solenoid.

That is, a conventional pressure-driven engine for obtaining reciprocating motion or rotational motion necessarily requires a switch valve, and a power and an electric equipment for controlling and driving the switch valve, so that the equipment cost and the management of the equipment are also required In certain cases of limiting the equipment, the use of the driving source other than compression air is difficult.

Especially, in the case in which great importance is attached on the portability and the handling property as in the case of tools held by hand, the power source, the connecting cord and the solenoid regulate the moving range and increase the weight of the tools, thereby deteriorating the operability.

SUMMARY OF THE INVENTION

Accordingly, it is a first object of the present invention to eliminate the above-described problems in the prior art and to provide a pressure-driven engine which is dispensed with separate switch valve and control unit.

It is a second object of the present invention to provide a pressure-driven engine for which the type of a pressure-driving source is freely selected It is a third object of the present invention to provide a pressure-driven engine which is dispensed with another driving source such as a power source so as not to be ignitable.

To achieve this aim, the present invention provides a pressure-driven engine which is composed of an engine body comprising: a cylinder provided with an air hole at one end thereof, and an intake hole and an exhaust hole connected to a pressure-driving source on the other end thereof; a piston slidably inserted into the cylinder and having a return spring around the shaft or the connecting rod thereof, an intake valve and an exhaust valve for opening and closing the intake hole and the exhaust hole, respectively, each of the valves having a valve rod slidably inserted into the corresponding pair of sliding portions provided at one end of the piston and a pair of springs which are provided around the valve rod on both sides of the sliding portion; an intake magnet opposed to the intake valve so as to open the intake hole by attracting the intake valve; and an exhaust magnet opposed to the exhaust valve so as to open the exhaust hole by attracting the exhaust valve.

A plurality of engine bodies may preferably be arranged in parallel with each other In this case, the engine can be a multi-cylinder engine like an internal combustion engine.

A plurality of engine bodies may also preferably be arranged in opposition to each other. In this case, the engine can be utilized for the work which requires both advancing motion and backing motion.

It is also preferable that a plurality of engine bodies are arranged with the respective pistons connected to each other by a crank mechanism. In this case, the reciprocating motion can be utilized as a smooth rotational motion.

It is also preferable to provide a plurality of engine bodies by connecting the respective pistons with each other by a crank mechanism and to omit the return springs of the respective pistons. In this case, the working efficiency is further improved.

The above and other objects, features and advantages of the present invention will become clear from the following description of the preferred embodiments thereof, taken in conjunction with the accompanying drawings.

BRIEF DESCRIPTION OF THE DRAWINGS

FIGS. 1 and 2 show an embodiment of a pressure-driven engine according to the present invention, wherein FIG. 1 is a vertical sectional view of the main part thereof in the state in which the piston is accommodated (at the bottom dead point), and FIG. 2-is a vertical sectional view of the main part thereof in the state in which the piston is projecting (at the top dead point);

DESCRIPTION OF THE PREFERRED EMBODIMENTS

Figure 1:
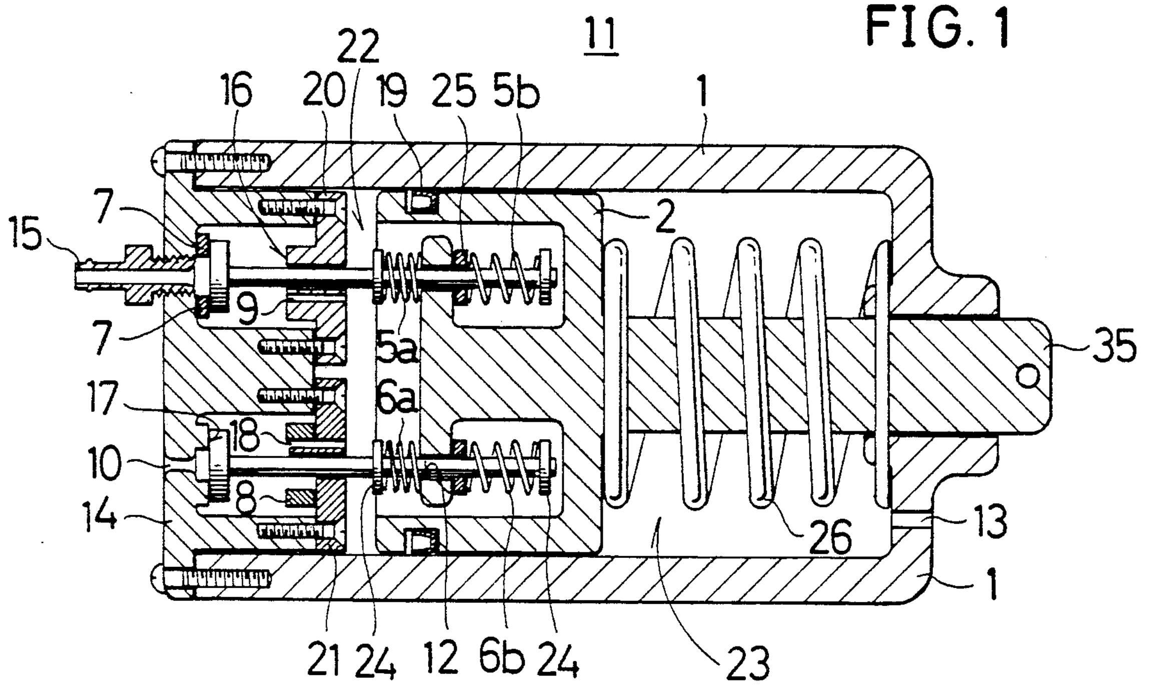

An embodiment of the present invention will be explained with reference to FIGS. 1 and 2. A cylinder 1 is made of a synthetic resin and a piston is slidably inserted in the cylinder 1. The cylinder is divided into a pressurizing chamber and a back pressure chamber 23 by the piston 2. In the back pressure chamber 23, an air hole 13 is provided and a return spring 26 for constantly urging the piston 2 toward the pressurizing chamber 22.

To the pressurizing chamber 22 of the cylinder 1, a lid 14 made of a synthetic resin is attached, and the lid 14 is provided with a passage 15 connected to a compressor or the like so as to introduce pressurized air set at a desired supply pressure therethrough and an exhaust hole 10.

An intake valve 3 and an exhaust valve 4 have respective valve rods 33, 34 slidably inserted into sliding portions 12 provided on the side of the pressurizing chamber 22, and the intake valve rod 33 have springs 5*a*, 5*b* therearound on both sides of the sliding portion 12. The intake valve 3 can be freely brought into contact with an intake valve seat 16 of an intake bearing body 20 so as to open and close the intake hole 9 thereof. A pair of permanent magnets 7 are secured to the lid 14 so that when the intake valve 3 is attracted by the permanent magnets 7, the intake hole 9 is opened.

An exhaust valve rod 34 have springs 6*a*, 6*b* therearound on both sides of the sliding portion 12. The exhaust valve does not close a communication hole 18 of an exhaust bearing body 21 and can be freely brought into contact with an exhaust valve seat 17 of the exhaust bearing body 21 so as to open and close an exhaust hole 10. A pair of permanent magnets 8 are secured to the exhaust bearing body 21 so that when the exhaust valve 4 is attracted by the permanent magnets 8, the exhaust hole 10 is opened.

The reference numeral 19 represents a packing for keeping the airtightness of the piston 2, and 24 and 25 are spring seats.

The operation of this embodiment will now be explained. In FIG. 1, when pressurized air is introduced through the passage 15, the pressurized air passes through the intake hole 9 and fills the pressurizing chamber 22.

At this time, although the pressurized air passes through the communication hole 18, since the exhaust hole 10 is closed by the exhaust valve 10, the pressure is risen so that the piston 2 begins to slide to the left in the figure.

The sliding operation of the piston 2 contracts the spring **5*b* of the intake valve 3 and extends the spring 5*a* thereof. Although the intake valve rod 33 of the intake valve 3 is about to slide so as to close the intake hole 9 by the intake valve 3, the attractive force of the magnets 7 is too strong as to allow the intake valve 3** to move.

The spring **6*b* of the exhaust valve is contracted and the spring 6*a* thereof is extended Although the exhaust valve rod 34 of the exhaust valve 4 is about to slide so as to open the exhaust hole 10, the urging force of the spring 6*a* and the air pressure applied to the exhaust valve 4 do not allow the exhaust valve 4** to move.

Figure 2:
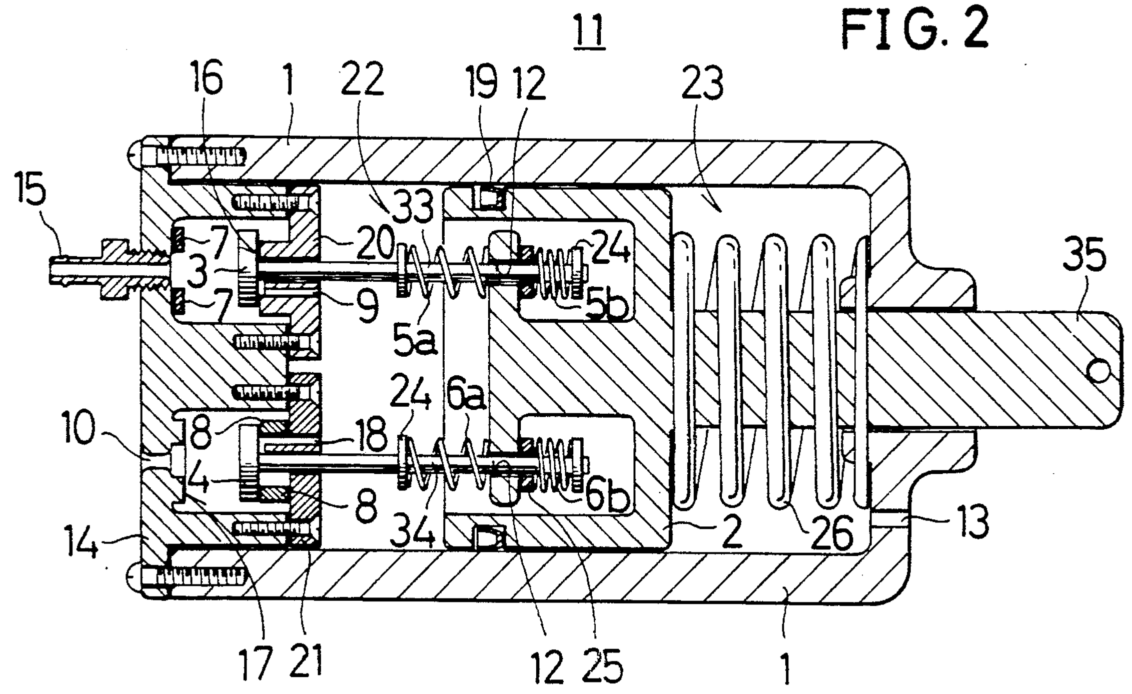

When the piston 2 has reached the top dead point at last, the intake valve 3 moves against the attractive force of the magnets 7, and closes the intake hole 9 in cooperation with the urging force of the spring **5*b*, as shown in FIG. 2**.

At this time, the exhaust valve 4 also moves against the air pressure and the movement is accelerated both by the urging force of the spring **6*b* and the attractive force of the magnets 8. Thus, the exhaust hole 10** is opened, and the pressure of the pressurizing chamber is gradually reduced to atmospheric pressure.

The piston 2 then begins to slide toward the bottom dead point by the urging force of the return spring 26.

During this time, the exhaust valve 4 is not moved due to the urging force of the spring **6*b* and the attractive force of the magnets 8 nor does the intake valve 3 move due to the urging force of the spring 5*b* and the pressure of the pressurized air applied to the intake valve 3. When the piston 2 has reached the bottom dead point at last, the exhaust valve 4 moves again against the attractive force of the magnets 8 by virtue of the urging force of the spring 6*a*, and closes the exhaust hole 9, as shown in FIG. 1**.

Although the intake valve 4 begins to move so as to open the intake hole 9, the movement is accelerated by the attractive force of the magnets 7, the intake hole 9 is opened in a moment.

The urging forces of the springs **5*b* and 6*a* are ordinarily stronger than those of the springs 5*a* and 6*b***, respectively.

If the amount of pressurized air introduced through the passage 15 and the amount of exhaust from the exhaust hole 10 are adjusted, the piston sliding speed is variable.

The above-described relationship between the urging force and the attractive force is shown in Table 1. The ordinate represents the driving force α, which is the urging force or the attractive force, and the abscissa represents the working distance X. The attractive force of the magnet is represented by the line A and the urging force of the spring **5*b* or 6*a*** is represented by the line B.

TABLE 1

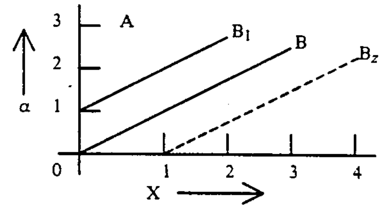

The attractive force of the magnet is calculated from the following formula:

$$\alpha = K\frac{1}{X^2}$$

wherein K represents the intensity of the line of magnetic force, and the valve switching point is obtained by the intersection between the line A and the line B.

If the urging force is changed into another force such as those indicated by the lines $B_1$ and $B_2$, the intersection is also varied. Thus, a desired intersection can be produced. It is naturally possible to produce a desired intersection by varying the line of magnetic force of the magnet.

TABLE 2

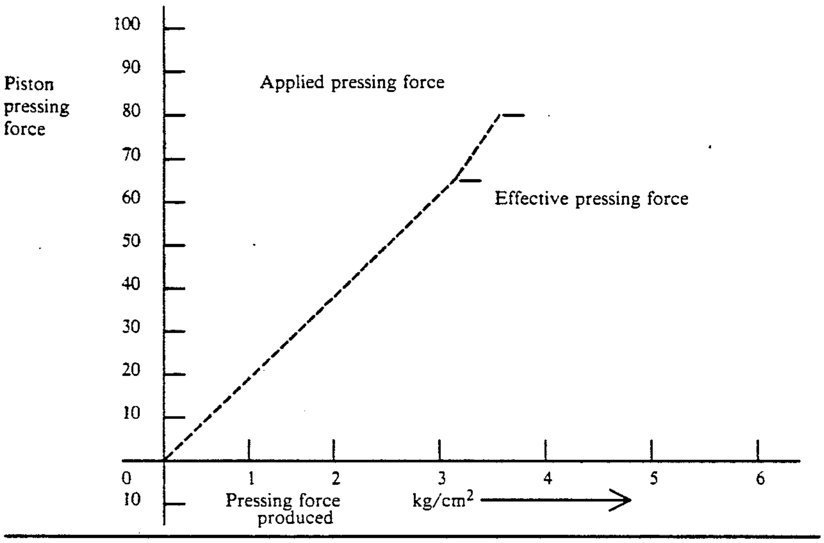

The influence of the return spring of the piston on the pressing force of the piston (working efficiency) is represented in Table 2. In this case, the diameter of the piston is set at 50 mm and the stretching force of the return spring is set at 5 kg.

Although the actual pressing force of the piston is the value calculated by subtracting 5 kg from the value shown in Table 2, in consideration of a practical numerical value range, for example, if the supply pressure is 5 $kg/cm^2$, the effective pressing force which is practically usable with respect to 100 kg, which is the pressing force produced. In other words, the efficiency is 95%.

If a plurality of engine bodies are used by means of a crank mechanism, since the backing motion is actuated by the advancing motion between each other, the return spring may be dispensed with, as desired.

Figure 3:
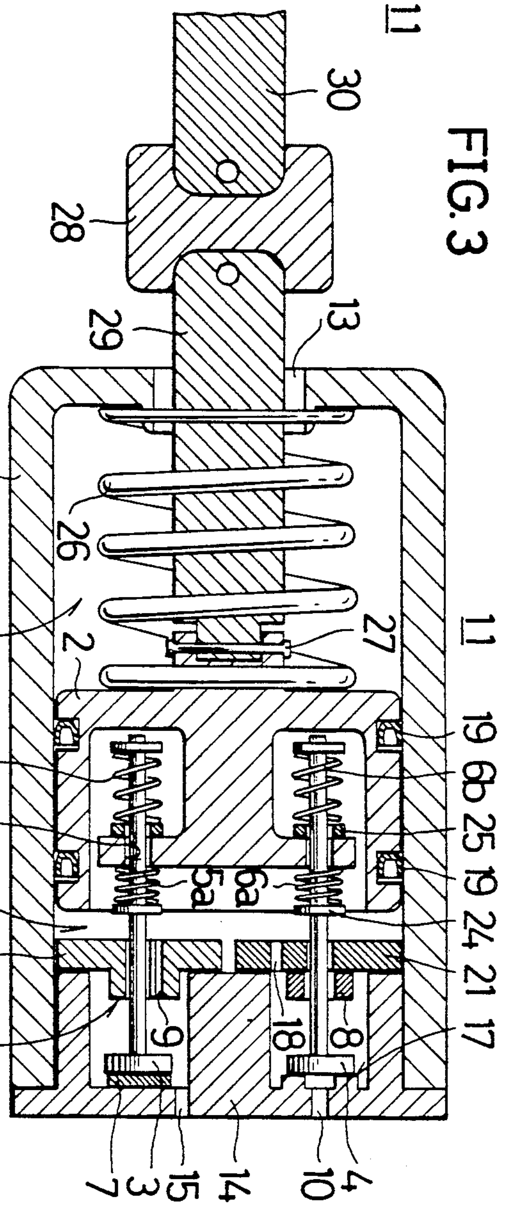
FIG. 3 a vertical sectional view of the main part of another embodiment.

FIG. 3 shows another embodiment of the present invention. A plurality of engine bodies 11 are provided in opposition to each other.

The magnet 7 is an integral disc-shaped rare earth magnet and the magnet 8 is an integral annular rare earth magnet. The piston 2 has a connecting rod 29 rotatably connected to the piston 2 by a pin 27.

The connecting rod 29 is attached to an adapter plate 28 on which a blade or the like is mounted. To the adapter plate 28, another connecting rod 30 is attached so as to be opposed to the connecting rod 29.

That is, a plurality of opposing pairs of pistons 2 with the top and the bottom dead points reversed in each pair are combined. This embodiment is effective when a large force is required not only at the time of advancing motion but also at the time of backing motion. In this case, the return spring 26 may be dispensed with, or sufficed with a small urging force, so that the working efficiency is enhanced.

Figure 4:
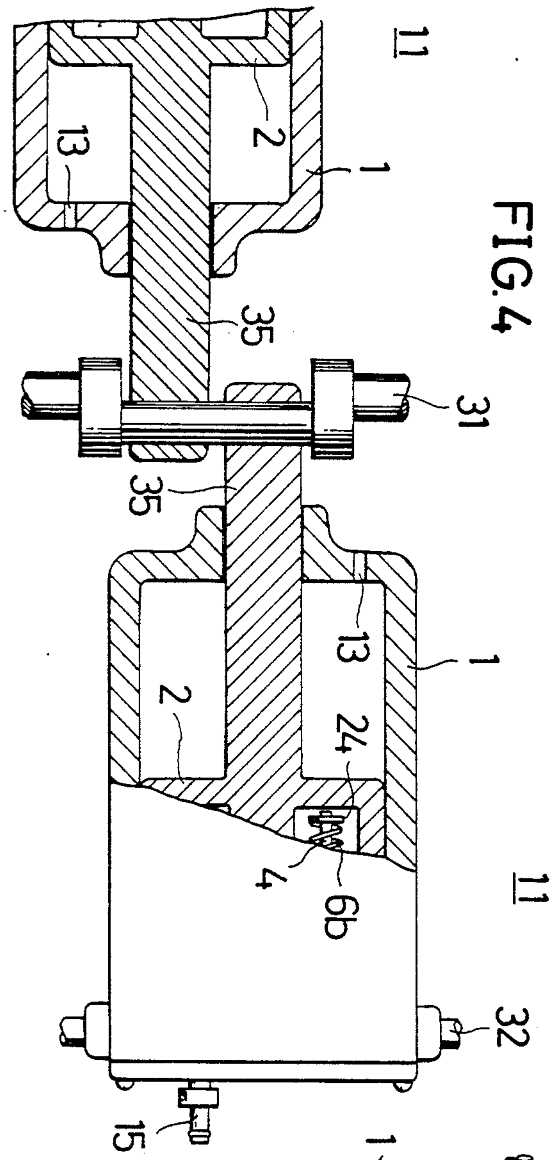
FIGS. 4 and 5 are partially cutaway elevational view of the main parts of further embodiments.

FIG. 4 shows still another embodiment of the present invention. A plurality of engine bodies 11 are provided in opposition to each other through a crank mechanism 31. The crank mechanism 31 converts the reciprocating motion of the piston 2 into rotational motion.

The cylinder 1 is rockably fixed to a fixing portion 32.

Figure 5:
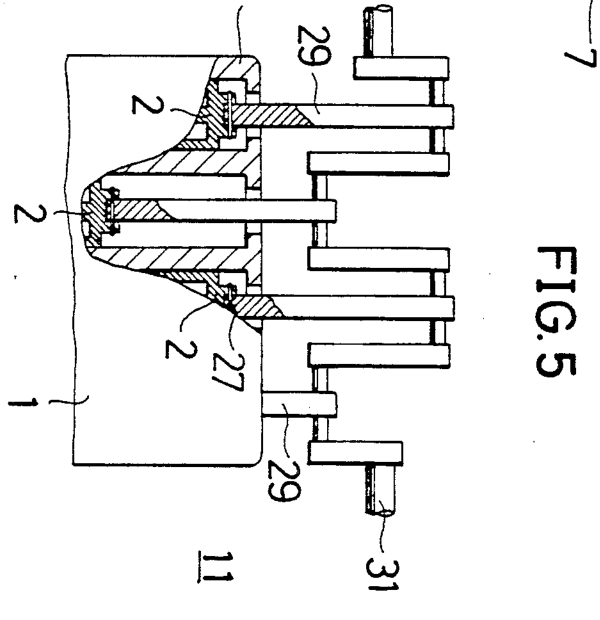

FIG. 5 shows a further embodiment of the present invention. A plurality of engine bodies 11 are integrally provided in parallel with each other while being connected by the crank mechanism 31.

As described above, according to the present invention, since it is possible to produce reciprocating motion only by the supply from a pressure-driving source, no power source, electromagnetic valve, nor controlling unit therefor is required. Thus, the engine is light in weight and low in cost and has a good handling property, which enhances the portability of tools.

Since the valve structure is accommodated in the engine, the noise is reduced, and since the engine is not at all ignitable, it is usable in the workshop containing a combustible material. In addition, since the type of a supply pressure source is not restricted, the engine of the present invention can be widely used in any place.

Furthermore, it is possible to produce a large force (pressing force) required by varying the diameter of the cylinder and the pressure supplied without any shock and, in addition, the speed thereof is also easily controllable.

While there has been described what is at present considered to be a preferred embodiment of the invention, it will be understood that various modifications may be made thereto. For example, a plurality of engine bodies may be arranged radially around the crank mechanism. It is intended that the appended claims all such modifications as fall within the true spirit and scope of the invention.

What is claimed is:

1. A pressure-drive engine which is composed of an engine body comprising:

a cylinder provided with an air hole at one end thereof, and an intake hole connected to a pressure source and an exhaust hole on the other end thereof;

a piston slidably inserted into said cylinder and having a return spring around a piston rod thereof;

an intake valve and an exhaust valve for opening and closing said intake hole and said exhaust hole, respectively, each of said intake valve and said exhaust valve having a valve rod slidably inserted into a corresponding pair of sliding portions provided at one end of said piston and a pair of springs which are provided around said valve rod on both sides of said corresponding sliding portion;

an intake magnet opposed to the intake valve so as to open said intake hole by attracting said intake valve; and an exhaust magnet opposed to said exhaust valve so as to open said exhaust hole by attracting said exhaust valve.

2. A pressure-driven engine according to claim 1, wherein a plurality of said engine bodies are arranged in parallel with each other.

3. A pressure-driven engine according to claim 1, wherein a plurality of said engine bodies are arranged in opposition to each other.

4. A pressure-driven engine according to claim 1, wherein a plurality of said engine bodies are arranged with the respective pistons connected to each other by a crank mechanism.

* * * * *